US012586560B2

(12) United States Patent
Park et al.

(10) Patent No.: US 12,586,560 B2
(45) Date of Patent: Mar. 24, 2026

(54) ELECTRONIC APPARATUS, TERMINAL APPARATUS AND CONTROLLING METHOD THEREOF

(71) Applicant: SAMSUNG ELECTRONICS CO., LTD., Suwon-si (KR)

(72) Inventors: Sangjun Park, Suwon-si (KR); Kihyun Choo, Suwon-si (KR); Hyoungmin Park, Seoul (KR); Junesig Sung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 18/235,124

(22) Filed: Aug. 17, 2023

(65) Prior Publication Data

US 2023/0395060 A1 Dec. 7, 2023

Related U.S. Application Data

(63) Continuation of application No. PCT/KR2022/009125, filed on Jun. 27, 2022.

(30) Foreign Application Priority Data

Oct. 18, 2021 (KR) ........................ 10-2021-0138343

(51) Int. Cl.
*G10L 13/04* (2013.01)
*G10L 13/047* (2013.01)
*G10L 13/10* (2013.01)

(52) U.S. Cl.
CPC ............ *G10L 13/047* (2013.01); *G10L 13/10* (2013.01)

(58) Field of Classification Search
CPC ....... G10L 13/047; G10L 13/10; G10L 25/69; G10L 13/08; G10L 13/02; G10L 15/063; G10L 25/51
See application file for complete search history.

(56) References Cited

U.S. PATENT DOCUMENTS 5,850,629 A 12/1998 Holm et al.
9,704,476 B1 7/2017 Swietlinski et al.
(Continued)

FOREIGN PATENT DOCUMENTS

CN 112530400 A 3/2021
CN 112599141 A 4/2021
(Continued)

OTHER PUBLICATIONS

International Search Report (PCT/ISA/210) dated Oct. 7, 2022 in International Application No. PCT/KR2022/009125.
(Continued)

*Primary Examiner* — Qian Yang
(74) *Attorney, Agent, or Firm* — Sughrue Mion, PLLC

(57) ABSTRACT

An electronic apparatus, a terminal apparatus, and a controlling method thereof. The electronic apparatus includes an input interface; and a processor including a prosody module configured to extract an acoustic feature and a vocoder module configured to generate a speech waveform, wherein the processor is configured to: receive a text input using the input interface; identify a first acoustic feature from the text input using the prosody module, wherein the first acoustic feature corresponds to a first sampling rate; generate a modified acoustic feature corresponding to a modified sampling rate different from the first sampling rate, based on the identified first acoustic feature; and generate a plurality of vocoder learning models by training the vocoder module based on the first acoustic feature and the modified acoustic feature.

8 Claims, 11 Drawing Sheets

(56) References Cited

U.S. PATENT DOCUMENTS

| | | | |
|---|---|---|---|
| 11,211,051 B2 | 12/2021 | Tian | |
| 11,475,878 B2 | 10/2022 | Min et al. | |
| 2012/0330667 A1 | 12/2012 | Sun et al. | |
| 2021/0110817 A1 | 4/2021 | Lee et al. | |
| 2021/0134269 A1 | 5/2021 | Min et al. | |
| 2021/0142782 A1 | 5/2021 | Wolf et al. | |
| 2021/0174782 A1* | 6/2021 | Kim | G06N 20/00 |
| 2021/0390943 A1 | 12/2021 | Gao et al. | |
| 2023/0017302 A1 | 1/2023 | Min et al. | |

FOREIGN PATENT DOCUMENTS

| | | | |
|---|---|---|---|
| CN | 113470616 | A | 10/2021 |
| JP | 2005-55607 | A | 3/2005 |
| JP | 2013-3559 | A | 1/2013 |
| JP | 2021-12354 | A | 2/2021 |
| KR | 10-2021-0036883 | A | 4/2021 |
| KR | 10-2021-0044484 | A | 4/2021 |
| KR | 10-2021-0053020 | A | 5/2021 |
| KR | 10-2021-0122071 | A | 10/2021 |
| WO | 0046795 | A1 | 8/2000 |
| WO | 2020062217 | A1 | 4/2020 |

OTHER PUBLICATIONS

Written Opinion (PCT/ISA/237) dated Oct. 7, 2022 in International Application No. PCT/KR2022/009125.

Mitsui et al., "MSR-NV: Neural Vocoder Using Multiple Sampling Rates", ArXiv, Sep. 28, 2021, 5 total pages, arXiv:2109.13714, XP 91061135 A.

Communication dated Jul. 8, 2024, issued by European Patent Center in European Patent Application No. 22883711.8.

Communication issued Sep. 17, 2025 by the Korean Intellectual Property Office in Korean Patent Application No. 10-2021-0138343.

Communication issued Nov. 25, 2025 by the European Patent Office in European Patent Application No. 22883711.8.

* cited by examiner

ELECTRONIC APPARATUS, TERMINAL APPARATUS AND CONTROLLING METHOD THEREOF

CROSS-REFERENCE TO RELATED APPLICATIONS

This application is a bypass continuation of International Application No. PCT/KR2022/009125 designating the United States, filed on Jun. 27, 2022, in the Korean Intellectual Property Receiving Office and claiming priority to Korean Patent Application No. 10-2021-0138343, filed Oct. 18, 2021, in the Korean Intellectual Property Office, the disclosures of which are incorporated by reference herein in their entireties.

BACKGROUND

1. Field

The disclosure relates to an electronic apparatus, a terminal apparatus and a controlling method thereof. More particularly, the disclosure relates to an electronic apparatus generating a speech waveform from a text and outputting the same, a terminal apparatus and a controlling method thereof.

2. Description of Related Art

With the development of speech processing technology, electronic apparatuses performing speech processing functions are being utilized. One from among the various voice processing functions is a text to speech (TTS) function. The TTS function may refer to the function of converting text to speech and outputting a speech or voice signal. In an example the TTS function may perform a speech conversion function by using a prosody part and a vocoder part. The prosody part may estimate an acoustic feature based on a text. That is, the prosody part may estimate pronunciation, cadence, and the like of a synthesized sound. The estimated acoustic feature may be input to the vocoder part. The vocoder part may estimate a speech waveform from the input acoustic feature. As the speech waveform estimated from the vocoder part is output through a speaker, the TTS function may be performed.

In general, the prosody part and the vocoder part may be trained to estimate the speech waveform from the acoustic feature, but because the vocoder part only supports the acoustic feature used in training, only the speech waveform having a fixed sampling rate may be output. Accordingly, to output the speech waveform of various sampling rates, a separate prosody part and vocoder part may be used.

One electronic apparatus may output a voice signal of various sampling rates, and voice signals of different sampling rates from one another may be output according to the electronic apparatus. In addition, a specification of an external speaker connected to one electronic apparatus may also be varied. A related art method has a disadvantage of training the separate prosody part and the vocoder part and using the trained prosody part and the vocoder part universally, and including a plurality of prosody parts and a plurality of vocoder parts in the one electronic apparatus.

Accordingly, there is a need for technology capable of outputting a voice signal of various sampling rates using one prosody part and vocoder part.

SUMMARY

Provided are an electronic apparatus including a vocoder part which outputs a speech waveform of various sampling rates using a same acoustic feature estimated from one prosody part and a controlling method thereof. In addition, provided are a specification of an electronic apparatus, and an electronic apparatus outputting a voice signal which includes an audio feature corresponding to the identified specification and a controlling method thereof.

In accordance with an aspect of the disclosure, an electronic apparatus includes an input interface; and a processor including a prosody module configured to extract an acoustic feature and a vocoder module configured to generate a speech waveform, wherein the processor is configured to: receive a text input using the input interface; identify a first acoustic feature from the text input using the prosody module, wherein the first acoustic feature corresponds to a first sampling rate; generate a modified acoustic feature corresponding to a modified sampling rate different from the first sampling rate, based on the identified first acoustic feature; and generate a plurality of vocoder learning models by training the vocoder module based on the first acoustic feature and the modified acoustic feature.

The processor may be further configured to generate the modified acoustic feature by down-sampling the first acoustic feature.

The processor may be further configured to generate the modified acoustic feature by performing approximation of the first acoustic feature based on a pre-set acoustic feature.

The modified acoustic feature may include a first modified acoustic feature, and the processor may be further configured to train the vocoder module based on the first modified acoustic feature approximated based on the pre-set acoustic feature and a second modified acoustic feature generated by down-sampling the first acoustic feature.

In accordance with an aspect of the disclosure, a terminal apparatus includes a processor including a prosody module and a vocoder module including a plurality of vocoder learning models trained with different sampling rates; and a speaker, wherein the processor is configured to: identify a specification of a component associated with the terminal apparatus; select a vocoder learning model from among the plurality of vocoder learning models based on the identified specification of the component; identify an acoustic feature from a text using the prosody module; generate a speech waveform corresponding to the identified acoustic feature using the selected vocoder learning model; and output the generated speech waveform through the speaker.

The processor may be further configured to identify candidate vocoder learning models based on a specification of an internal component of the terminal apparatus, and a result of determining whether a streaming output of the speech waveform is possible.

The processor may be further configured to select the vocoder learning model based on a highest sampling rate from among sampling rates corresponding to the candidate vocoder learning models, and a highest sound quality from among sound qualities corresponding to the candidate vocoder learning models.

The processor may be further configured to select the vocoder learning model based on a resource of the processor.

The speaker may include at least one from among an internal speaker included inside the terminal apparatus, and an external speaker connected to the terminal apparatus.

The processor may be further configured to identify a specification of the external speaker, and select the vocoder learning model based on the identified specification of the external speaker.

In accordance with an aspect of the disclosure, a controlling method of an electronic apparatus includes receiving a text input; identifying a first acoustic feature from the text input using a prosody module configured to extract an acoustic feature, wherein the first acoustic feature corresponds to a first sampling rate; generating a modified acoustic feature having a modified sampling rate different from the first sampling rate based on the identified first acoustic feature; and generating a plurality of vocoder learning models by training a vocoder module configured to generate a speech waveform based on the first acoustic feature and the modified acoustic feature.

The modified acoustic feature may be generated by down-sampling the first acoustic feature.

The modified acoustic feature may be generated by performing approximation of the first acoustic feature based on a pre-set acoustic feature.

The modified acoustic feature may include a first modified acoustic feature, and the generating the plurality of vocoder learning models may include training the vocoder module based on the first modified acoustic feature and a second modified acoustic feature generated by down-sampling the first acoustic feature.

In according with an aspect of the disclosure, a controlling method of a terminal apparatus includes identifying a specification of a component associated with the terminal apparatus; selecting a vocoder learning model from among a plurality of vocoder learning models based on the identified specification of the component; identifying an acoustic feature from a text using a prosody module; generating a speech waveform corresponding to the identified acoustic feature using the identified vocoder learning model; and outputting the generated speech waveform through the speaker.

In accordance with an aspect of the disclosure, a system for generating speech waveforms includes an electronic device including an input/output (I/O) interface and a first processor, wherein the first processor includes a first prosody module configured to extract acoustic features and a first vocoder module configured to generate the speech waveforms, wherein the first processor is configured to: receive a first text input using the I/O interface; determine a first acoustic feature from the first text input using the first prosody module, wherein the first acoustic feature corresponds to a first sampling rate; generate a modified acoustic feature corresponding to a modified sampling rate different from the first sampling rate, based on the identified first acoustic feature; and generate a plurality of vocoder learning models by training the first vocoder module based on the first acoustic feature and the modified acoustic feature; and transmit the plurality of vocoder learning models to a terminal device.

The system may further include the terminal device, the terminal device may include a speaker and a second processor including a second prosody module and a second vocoder module configured to store the plurality of vocoder learning models received from the electronic device, the second processor may be configured to: identify a specification of a component associated with the terminal device; select a vocoder learning model from among the plurality of vocoder learning models based on the identified specification of the component; determine a second acoustic feature from a second input text using the prosody module; generate a speech waveform corresponding to the second acoustic feature using the selected vocoder learning model; and output the speech waveform corresponding to the second acoustic feature through the speaker.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
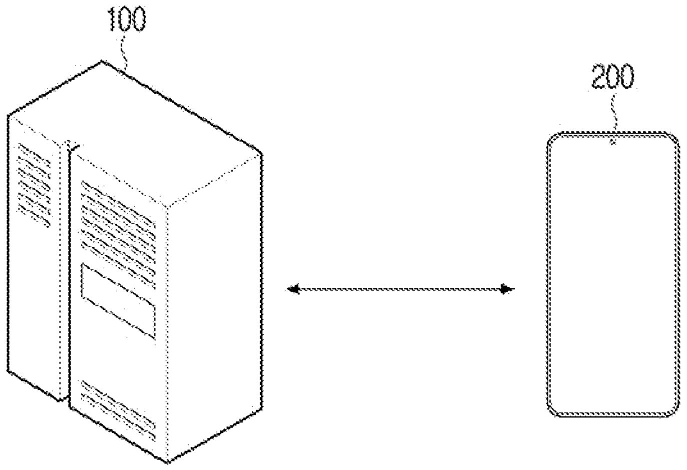
FIG. 1 is a diagram illustrating a system including an electronic apparatus and a terminal apparatus according to an embodiment.

Various embodiments of the disclosure will be described in greater detail below with reference to the accompanying drawings. The embodiments disclosed herein may be variously modified. Specific embodiments may be described in the drawings and described in detail in the detailed description. However, the specific embodiments described in the accompanied drawings are merely to assist in the comprehensive understanding of the various embodiments. Accordingly, it is to be understood that the technical spirit of the disclosure is not to be limited by the specific embodiments described in the accompanied drawings, and that all equivalents or alternatives included in the technical spirit and scope are to included herein.

Terms including ordinal numbers such as first, second, and so on may be used to describe various components, but the components are not limited by the above-described terms. The terms described above may be used only for the purpose of distinguishing one component from another component.

In the disclosure, it is to be understood that terms such as "comprise" or "include" are used herein to designate a presence of a characteristic, number, step, operation, element, component, or a combination thereof described in the disclosure, and not to preclude a presence or a possibility of adding one or more of other characteristics, numbers, steps, operations, elements, components or a combination thereof. When a certain component is indicated as being "coupled with/to" or "connected to" another element, it may be understood as the certain element being directly coupled with/to or connected to the another element, but it may also be understood as other element being present therebetween. On the other hand, when a certain element is indicated as "directly coupled with/to" or "directly connected to" another element, it may be understood as the other element not being present therebetween.

The terms "module" or "part" for components used in the embodiments herein perform at least one function or operation. Further, "module" or "part" may be configured to perform a function or an operation implemented with a hardware or software, or a combination of hardware and software. In addition, a plurality of "modules" or a plurality of "parts", except for a "module" or a "part" which needs to be implemented to a specific hardware or at least one processor, may be integrated to at least one module. A singular expression includes a plural expression, unless otherwise specified.

In describing the disclosure, the order of each step is to be understood as non-limiting unless a preceding step must be performed logically and temporally prior to a following step. That is, except for exceptional cases as described above, even if a process described as the following step is performed preceding a process described as the preceding step, it does not influence the nature of the disclosure and the scope of protection should also be defined regardless of the order of the step. Further, in the disclosure, expressions such as "A or B" not only refers to any one of A and B selectively, but also may be defined as including both A and B. In addition, the term "include" may have a comprehensive meaning of further including other component in addition to the components listed as included.

In the disclosure, some components not related to the nature of the disclosure may be omitted. Further, the disclosure is not to be construed in an exclusive sense including only the recited components, but to be interpreted in a non-exclusive sense where other components may be included.

Additionally, in describing the disclosure, in case it is determined that the detailed description of related known technologies may unnecessarily confuse the gist of the disclosure, the detailed description thereof will be omitted. Respective embodiments may be implemented or operated independently, but the respective embodiments may be implemented or operated in combination.

FIG. 1 is a diagram illustrating a system including an electronic apparatus and a terminal apparatus according to an embodiment.

Referring to FIG. 1, the system may include an electronic apparatus 100 and a terminal apparatus 200. For example, the electronic apparatus 100 may include a server, a cloud, or the like, and the server or the like may include a management server, a training server, and the like. Further, the terminal apparatus 200 may include a smartphone, a tablet personal computer (PC), a navigation, a slate PC, a wearable device, a digital television (TV), a desktop computer, a laptop computer, a home appliance, an Internet of Things (IoT) device, a kiosk, and the like.

The electronic apparatus 100 may include a prosody module and a vocoder module. The prosody module may include one prosody model, and the vocoder module may include a plurality of vocoder modules. Each of the prosody model and the vocoder model may be or include an artificial intelligence neural network model. The electronic apparatus 100 may extract an acoustic feature from a text using the prosody model. Because an error such as a pronunciation error may occur in the prosody model, the electronic apparatus 100 may correct the error in the prosody model through an artificial intelligence learning process.

One prosody model may extract an acoustic feature corresponding to a sampling rate of one type. For example, the prosody model may extract an acoustic feature corresponding to a sampling rate of 24 kHz. The electronic apparatus 100 may generate a modified acoustic feature based on the acoustic feature extracted from the prosody model. For example, the electronic apparatus 100 may generate an acoustic feature corresponding to a sampling rate of 16 kHz and a sampling rate of 8 kHz using the acoustic feature corresponding to the sampling rate of 24 kHz.

The electronic apparatus 100 may train the vocoder model of the vocoder module using the acoustic feature extracted from the prosody model and the modified acoustic feature. In embodiments, the vocoder module may be a single module, and may include a plurality of learning models respectively trained with acoustic features different from one another. For example, the electronic apparatus may train a first vocoder model based on the acoustic feature corresponding to the sampling rate of 24 kHz, train a second vocoder model based on the acoustic feature corresponding to the sampling rate of 16 kHz, and train a third vocoder model based on the acoustic feature corresponding to the sampling rate of 8 kHz.

Functions associated with an artificial intelligence according to the disclosure may be operated through a processor and a memory. The processor may include one or a plurality of processors. In embodiments, the one or plurality of processors may be a generic-purpose processor such as a central processing unit (CPU), an application processor (AP), and a digital signal processor (DSP), a graphics dedicated processor such as a graphics processing unit (GPU) and a vision processing unit (VPU), or an artificial intelligence dedicated processor such as a neural processing unit (NPU). The one or plurality of processors may be configured to control so as to process input data according to a pre-defined operation rule or an artificial intelligence model stored in the memory. In embodiments, based on the one or plurality of processors being an artificial intelligence dedicated processor, the artificial intelligence dedicated processor may be designed to a hardware structure specializing in processing of a specific artificial intelligence model.

The pre-defined operation rule or the artificial intelligence model may be characterized by being made through learning. This may mean a pre-defined operation rule or an artificial intelligence model set to perform a desired feature or object being made based on a basic artificial intelligence model being trained using multiple learning data by a learning algorithm. The learning may be performed in a device itself in which the artificial intelligence according to an embodiment is performed, or performed through a separate server and/or system. Examples of the learning algorithm may include supervised learning, unsupervised learning, semi-supervised learning, or reinforcement learning, but is not limited to the above-described examples.

The artificial intelligence model may include a plurality of neural network layers. The respective neural network layers may include a plurality of weight values, and perform neural network processing through processing the processing results of a previous layer and the plurality of weight values. The plurality of weight values included in the plurality of neural network layers may be optimized by a learning result of the artificial intelligence model. For example, the plurality of weight values may be updated such that a loss value or a cost value obtained from the artificial intelligence model during the learning process is reduced or minimized. An artificial neural network may include a deep neural network (DNN), and examples may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but is not limited to the above-described examples.

The prosody model and the vocoder model trained in the electronic apparatus 100 may be included in the terminal apparatus 200. The terminal apparatus 200 may also include the prosody module and the vocoder module. The electronic apparatus 100 may transmit the prosody model and a vocoder learning model to the terminal apparatus 200 using a wired or wireless communication method. In embodiments, the terminal apparatus 200 may be included with the prosody model and the vocoder learning model at the time of manufacture. That is, the vocoder module of the terminal apparatus 200 may include a plurality of vocoder learning models trained by various sampling rates. The terminal apparatus 200 may select an optimal vocoder learning model from among the plurality of vocoder learning models based on a specification of the terminal apparatus 200, whether or not streaming is output, a sampling rate, a sound quality, and the like. Further, the terminal apparatus 200 may output a text to a speech waveform using the selected vocoder learning model.

An embodiment of training the prosody model and the vocoder model in the electronic apparatus 100 has been described above. However, although an initial learning process may be performed in the electronic apparatus 100, a continuous learning process of correcting errors and updating thereafter may be performed in the terminal apparatus 200. In another embodiment, the electronic apparatus 100 may include the trained prosody model and the vocoder learning model, and the text transmitted from the terminal apparatus 200 may be generated to the speech waveform. Then, the generated speech waveform may be transmitted to the terminal apparatus 200. The terminal apparatus 200 may output the speech waveform received from the electronic apparatus 100 through a speaker.

A configuration of the electronic apparatus 100 and the terminal apparatus 200 will be described below.

Figure 2:
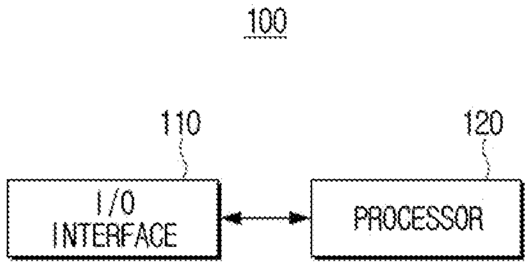
FIG. 2 is a block diagram illustrating a configuration of an electronic apparatus according to an embodiment.

FIG. 2 is a block diagram illustrating a configuration of an electronic apparatus according to an embodiment.

Referring to FIG. 2, the electronic apparatus 100 may include an input/output (I/O) interface 110 and a processor 120.

The I/O interface 110 may receive input of the text. In embodiments, the I/O interface 110 may receive input of a command from a user. For example, the I/O interface 110 may include a communication interface, an input and output port, and the like. The I/O interface 110 may be configured to perform a function of receiving input of the text or receiving input of the command of the user, and may be referred to as an input part, an input device, an input module, and the like.

Based on the I/O interface 110 being implemented as the communication interface, the I/O interface 110 may be configured to perform communication with an external device. The I/O interface 110 may be configured to receive text data from the external device by using the wired or wireless communication method. For example, the communication interface may include a module capable of performing communication through methods such as 3rd Generation (3G), Long Term Evolution (LTE), 5th Generation (5G), Wi-Fi, Bluetooth, Digital Multimedia Broadcasting (DMB), Advanced Television Systems Committee (ATSC), Digital Video Broadcasting (DVB), Local Area Network (LAN), and the like. The communication interface performing communication with the external device may be referred to as a communication part, a communication device, a communication module, a transmitting and receiving part, and the like.

Based on the I/O interface 110 being implemented as an input and output port, the I/O interface 110 may be configured to receive text data from the external device, including for example an external memory. For example, based on the I/O interface 110 being implemented as an input and output port, the input and output port may include ports such as a High-Definition Multimedia Interface (HDMI), a Universal Serial Bus (USB), Thunderbolt, and LAN.

The I/O interface 110 may receive input of a control command from the user. For example, the I/O interface 110 may include a keypad, a touch pad, a touch screen, and the like.

The processor 120 may be configured to control respective configurations of the electronic apparatus 100. For example, the processor 120 may be configured to control the I/O interface 110 to receive input of the text. The processor 120 may include or implement the prosody module configured to extract the acoustic feature and the vocoder module configured to generate the speech waveform. The processor 120 may be configured to identify or extract the acoustic feature from the input text using the prosody module. The processor 120 may be configured to generate the modified acoustic feature different in sampling rate from the identified acoustic feature based on the identified acoustic feature. For example, based on the identified acoustic feature being of the sampling rate of 24 kHz, the processor 120 may be configured to generate the acoustic feature of the 16 kHz sampling rate and the acoustic feature of 8 kHz sampling rate based on the acoustic feature of the 24 kHz sampling rate. The processor 120 may be configured to generate the modified acoustic feature through a method of down-sampling the identified acoustic feature or a method of approximation to a pre-set acoustic feature.

The processor 120 may be configured to train the vocoder model corresponding to the respective acoustic features and generate the vocoder learning model using the respective identified acoustic feature and the modified acoustic feature. For example, the processor 120 may be configured to generate the vocoder learning model which is trained with the identified acoustic feature. In embodiments, the processor 120 may be configured to generate the vocoder learning model which is trained with the down-sampled modifying acoustic feature or trained with the modified acoustic feature approximated to the pre-set acoustic feature. In embodiments, the processor 120 may be configured to generate the vocoder learning model which is trained by using both a first modified acoustic feature which is approximated to the pre-set acoustic feature and a second modified acoustic feature which is generated by down-sampling a first acoustic feature.

The electronic apparatus 100 may transmit the prosody model and the vocoder learning model to the terminal apparatus 200. For example, the electronic apparatus 100 may transmit the prosody model and the vocoder learning model to the terminal apparatus 200 through the input and output port or the communication interface.

Figure 3:
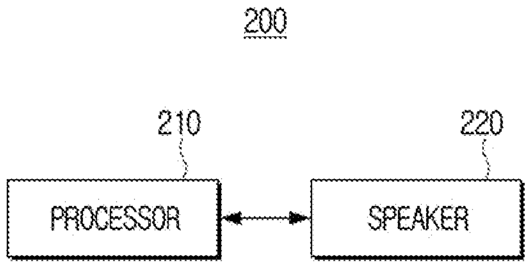
FIG. 3 is a block diagram illustrating a configuration of a terminal apparatus according to an embodiment.

FIG. 3 is a block diagram illustrating a configuration of a terminal apparatus according to an embodiment Referring to FIG. 3, the terminal apparatus 200 may include a processor 210 and a speaker 220.

The processor 210 may be configured to control the respective configurations of the terminal apparatus 200. Further, the processor 210 may include the prosody module configured to extract the acoustic feature and the vocoder module configured to generate the speech waveform. The prosody module of the processor 210 may include the trained prosody model, and the vocoder module of the processor 210 may include the plurality of vocoder learning models. The plurality of vocoder learning models may be models trained with different sampling rates from one another. The processor 210 may be configured to identify the specification of the component associated with the terminal apparatus 200. For example, the specification of the component may include a resource of the processor, whether there is an operation of the processor, a memory capacity, a memory bandwidth, a performance of the speaker, and the like. The specification of the component associated with the terminal apparatus 200 described above may be designated as an internal specification. The terminal apparatus 200 may be connected to an external speaker. In this case, the specification of the component associated with the terminal apparatus 200 may include information about the external speaker.

The processor 210 may be configured to select one vocoder learning model from among the plurality of vocoder learning models based on the identified specification of the component. For example, the processor 210 may be configured to identify a candidate vocoder learning model based on the specification of an internal component of the terminal apparatus from among the components and whether a streaming output of the speech waveform is possible. Further, the processor 210 may be configured to select one vocoder learning model based on a high sampling rate and sound quality from among the candidate vocoder learning models. In embodiments, the processor 210 may be configured to select one vocoder learning model based on the resource of the processor. As described above, the terminal apparatus may be connected to the external speaker. In this case, the processor 210 may be configured to identify the specification of the external speaker, and select one vocoder learning model based on the identified specification of the external speaker.

The processor 210 may be configured to identify the acoustic feature from the text by using the prosody module. For example, the terminal apparatus 200 may further include a memory, and the processor 210 may be configured to identify the acoustic feature from text data stored in the memory. In embodiments, the terminal apparatus 200 may further include a communication interface, and the processor 210 may be configured to identify the acoustic feature from the text data received through the communication interface. In embodiments, the terminal apparatus 200 may further include an input interface, and the processor 210 may be configured to identify the acoustic feature from the text data input through the input interface. In embodiments, one or more of the communication interface and the input interface may be similar to the I/O interface 110 described above. The processor 210 may be configured to generate the speech waveform corresponding to the identified acoustic feature by using the identified one vocoder learning model.

The speaker 220 may be configured to output the generated speech waveform. In embodiments, the speaker 220 may be configured to output an input command of the user, information associated with a state of the terminal apparatus 200, an operation associated information, or the like as a voice or notification sound.

Figure 4:
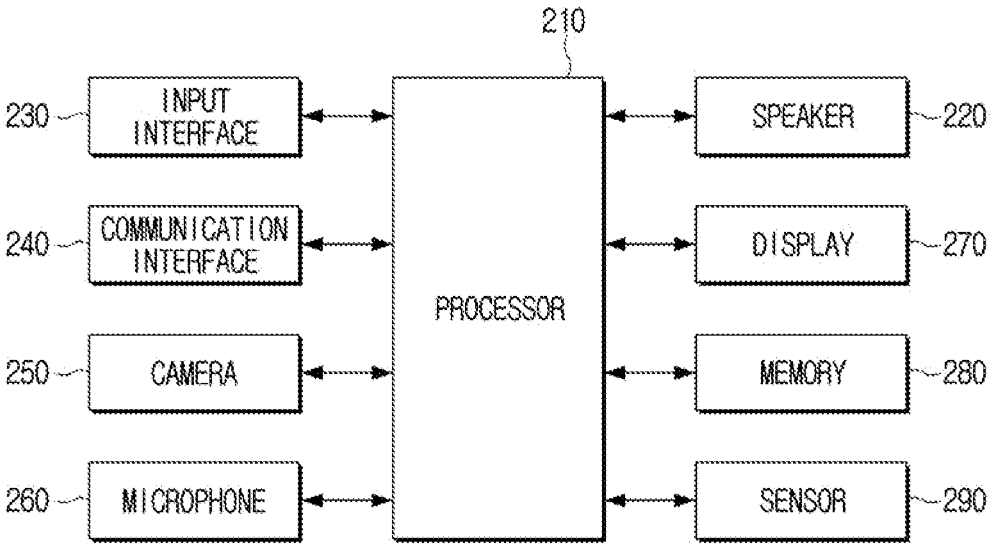
FIG. 4 is a block diagram illustrating a detailed configuration of a terminal apparatus according to an embodiment.

FIG. 4 is a block diagram illustrating a detailed configuration of a terminal apparatus according to an embodiment.

Referring to FIG. 4, the terminal apparatus 200 may include the processor 210, the speaker 220, an input interface 230, a communication interface 240, a camera 250, a microphone 260, a display 270, a memory 280, and a sensor 290. In embodiments, the speaker 220 may be similar to the speaker described above with respect to FIG. 3, and therefore a detailed description thereof is omitted.

The input interface 230 may be configured to receive input of the command of the user. In embodiments, the input interface 230 may be configured to receive input of text data from the user. The input interface 230 may be configured to perform a function of receiving input of the command of the user or text data from the outside, and may be referred to as an input part, an input device, an input module, or the like. For example, the input interface 230 may include the keypad, the touch pad, the touch screen, and the like.

The communication interface 240 may be configured to perform communication with the external device. The communication interface 240 may be provided with text data from the external device by using a wired or wireless communication method. In an embodiment, the text may be provided to the terminal apparatus 200 through a web server, a cloud, or the like. For example, the communication interface 240 may include modules capable of performing communication through methods such as 3G, Long Term Evolution (LTE), 5G, Wi-Fi, Bluetooth, Digital Multimedia Broadcasting (DMB), Advanced Television Systems Committee (ATSC), Digital Video Broadcasting (DVB), Local Area Network (LAN), and the like. The communication interface 240 performing communication with the external device may be referred to as the communication part, the communication device, the communication module, the transmitting and receiving part, and the like.

The camera 250 may be configured to capture a surrounding environment and receive input of a captured image. In an embodiment, the camera 250 may be configured to capture an image including a text, and the processor 210 may be configured to recognize the text included in the image with an Optical Character Recognition (OCR) function. For example, the camera 250 may include a charge coupled device (CCD) sensor and a complementary metal oxide semiconductor (CMOS) sensor.

The microphone 260 may be configured to receive input of an external sound signal. The processor 210 may be configured to process the input sound signal and perform a corresponding operation. For example, based on the external sound signal being a voice of the user, the processor 210 may be configured to recognize the control command based on the input voice, and perform a control operation corresponding to the recognized control command.

The display 270 may be configured to output an image signal of which image processing is performed. For example, the display 270 may be implemented as a Liquid Crystal Display (LCD), an Organic Light Emitting Diode (OLED), a flexible display, a touch screen, and the like. Based on the display 270 being implemented as the touch screen, the terminal apparatus 200 may receive input of the control command through the touch screen.

The memory 280 may be configured to store data and the like which perform functions of the terminal apparatus 200, and store programs, commands, and the like which are operated in the terminal apparatus 200. For example, the memory 280 may be configured to store text data, the prosody model, and the plurality of vocoder learning models. Further, the prosody model and the selected vocoder learning model stored in the memory 280 may perform an operation by being loaded to the processor 210 by the control of the processor 210. The program, AI model, data, and the like stored in the memory 280 may perform an operation by being loaded to the processor 210. For example, the memory 280 may be implemented to types such as a read only memory (ROM), a random access memory (RAM), a hard disk drive (HDD), a solid state drive (SSD), and a memory card.

The sensor 290 may be configured to detect an operation, a distance, a location, and the like of the user. The processor 210 may be configured to recognize the control command based on the operation, the distance, the location, and the like of the user detected from the sensor 290, and perform the control operation corresponding to the recognized control command. In embodiments, the sensor 290 may be configured to detect surrounding environment information of the terminal apparatus 200. The processor 210 may be configured to perform the corresponding control operation based on the surrounding environment information detected from the sensor 290. For example, the sensor 290 may include an acceleration sensor, a gravity sensor, a gyro sensor, a geomagnetic sensor, an orientation sensor, a motion recognition sensor, a proximity sensor, a voltmeter, an ammeter, a barometer, an hygrometer, a thermometer, an illuminance sensor, a thermal sensor, a touch sensor, an infrared sensor, an ultrasonic sensor, and the like.

Figure 5:
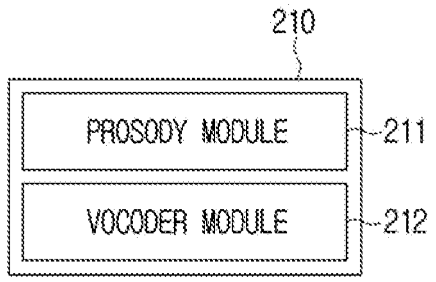
FIG. 5 is a block diagram illustrating a configuration of a processor according to an embodiment.

FIG. 5 is a block diagram illustrating a configuration of a processor according to an embodiment.

Referring to FIG. 5, the processor 210 may include the prosody module 211 and the vocoder module 212. The prosody module 211 may include the prosody model which extracts the acoustic feature, and the vocoder module 212 may include the vocoder learning model which generates the speech waveform from the extracted acoustic feature. In an embodiment, the prosody module 211 and the vocoder module 212 may be implemented as hardware or software. Based on the prosody module 211 and the vocoder module 212 being implemented as a hardware, the prosody module 211 and the vocoder module 212 may be implemented as one component or multiple components of the processor 210. Based on the prosody module 211 and the vocoder module 212 being implemented as software, the prosody module 211 and the vocoder module 212 may be stored in the memory, and loaded from the memory to the processor when the terminal apparatus 200 executes the TTS function. In embodiments, the prosody model and the vocoder learning model may be implemented as software, and may be loaded from the memory to the processor when the terminal apparatus 200 executes the TTS function.

The prosody module 211 may include the prosody model which extracts the acoustic feature from the text. The vocoder module 212 may include one vocoder learning model based on the specification and the like of the component associated with the terminal apparatus 200. The acoustic feature extracted from the prosody module 211 may be input to the vocoder module 212, and the vocoder module 212 may generate the speech waveform corresponding to the acoustic feature by using the selected vocoder learning model. The generated speech waveform may be output through the speaker.

Based on the above, the respective configurations of the terminal apparatus 200 have been described. Examples of processes of training the vocoder model, and selecting the optimal vocoder learning model from among the plurality of vocoder learning models will be described below.

Figure 6A:
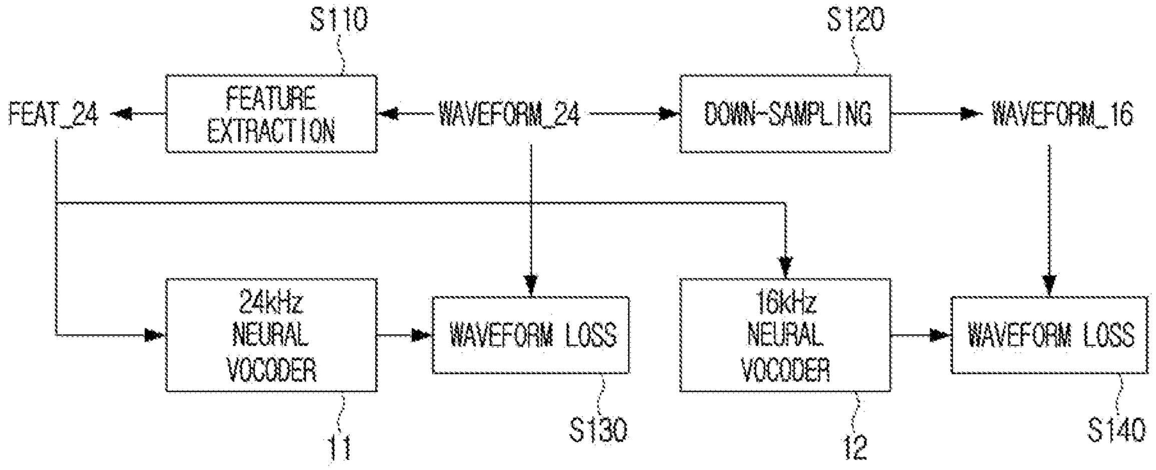
FIGS. 6A and 6B are diagrams illustrating a process of training a vocoder model according to an embodiment.
Figure 6B:
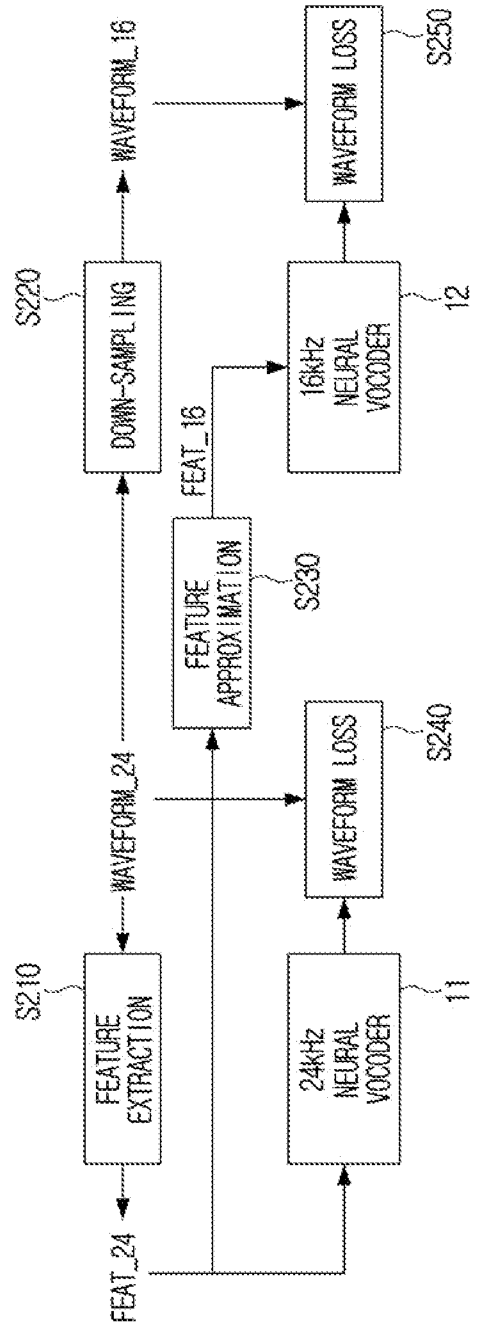

FIGS. 6A and 6B are diagrams illustrating a process of training a vocoder model according to an embodiment.

Referring to FIG. 6A, a process of training various vocoder models using the same prosody model is shown. For example, the vocoder model may be trained based on a 24 kHz speech waveform waveform_24. The prosody model may extract the 24 kHz acoustic feature feat_24 from the 24 kHz speech waveform waveform_24 at operation S110. The extracted 24 kHz acoustic feature feat_24 may be used in the process of training a vocoder model corresponding to the 24 kHz sampling rate, for example 24 kHz neural vocoder 11, and a vocoder model corresponding to the 16 kHz sampling rate, for example 16 kHz neural vocoder 12. Because the 24 kHz acoustic feature feat_24 includes all information of a 16 kHz speech waveform, it may be used in the training of the 16 kHz neural vocoder 12. The electronic apparatus may perform down-sampling of the 24 kHz speech waveform waveform_24 to the 16 kHz speech waveform waveform_16 for the training of the 16 kHz neural vocoder 12 at operation S120.

The extracted 24 kHz acoustic feature feat_24 may be input to the 24 kHz neural vocoder 11. Then, the 24 kHz neural vocoder 11 may generate the speech waveform having the 24 kHz sampling rate based on the input 24 kHz acoustic feature feat_24. The electronic apparatus may identify a loss of the speech waveform based on the generated speech waveform and the 24 kHz speech waveform waveform_24 used in the training at operation S130. The electronic apparatus may generate the vocoder learning model corresponding to the 24 kHz sampling rate by training the 24 kHz neural vocoder 11 based on the identified loss of the speech waveform.

In a similar method, the extracted 24 kHz acoustic feature feat_24 may be input to the 16 kHz neural vocoder 12. Then, the 16 kHz neural vocoder 12 may generate the speech waveform having the 16 kHz sampling rate based on the input 24 kHz acoustic feature feat_24. The electronic apparatus may identify the loss of the speech waveform based on the generated speech waveform and the down-sampled 16 kHz speech waveform waveform_16 at operation S140. The electronic apparatus may generate the vocoder learning model corresponding to the 16 kHz sampling rate by training the 16 kHz neural vocoder 12 based on the identified loss of the speech waveform.

Referring to FIG. 6B, a process of training the various vocoder models by performing an approximation process is shown. For example, the prosody model may extract the 24 kHz acoustic feature feat_24 from the 24 kHz speech waveform waveform_24 at operation S210. The extracted 24 kHz acoustic feature feat_24 may be used in the process of training the 24 kHz neural vocoder 11 and the 16 kHz neural vocoder 12. The electronic apparatus may perform down-sampling of the 24 kHz speech waveform waveform_24 to the 16 kHz speech waveform waveform_16 for the training of the 16 kHz neural vocoder 12 at operation S220.

The extracted 24 kHz acoustic feature feat_24 may be input to the 24 kHz neural vocoder 11. Then, the 24 kHz neural vocoder 11 may generate the speech waveform having the 24 kHz sampling rate based on the input 24 kHz acoustic feature feat_24. The electronic apparatus may identify the loss of the speech waveform based on the generated speech waveform and the 24 kHz speech waveform waveform_24 used in the training at operation S240. The electronic apparatus may generate the vocoder learning model corresponding to the 24 kHz sampling rate by training the 24 kHz neural vocoder 11 based on the identified loss of the speech waveform.

The electronic apparatus may perform an approximation of the 24 kHz acoustic feature feat_24 extracted from the prosody module to an acoustic feature corresponding to a pre-set sampling rate at operation S230. For example, the electronic apparatus may perform the approximation of the 24 kHz acoustic feature feat_24 to the 16 kHz acoustic feature feat_16. The approximated 16 kHz acoustic feature feat_16 may be used in the training of the 16 kHz neural vocoder 12. The approximated 16 kHz acoustic feature feat_16 may be input to the 16 kHz neural vocoder 12. Then, the 16 kHz neural vocoder 12 may generate the speech waveform having the 16 kHz sampling rate based on the input 16 kHz acoustic feature feat_16. The electronic apparatus may identify the loss of the speech waveform based on the generated speech waveform and the down-sampled 16 kHz speech waveform waveform_16 at operation S250. The electronic apparatus may generate the vocoder learning model corresponding to the 16 kHz sampling rate by training the 16 kHz neural vocoder 12 based on the identified loss of the speech waveform.

Figure 7A:
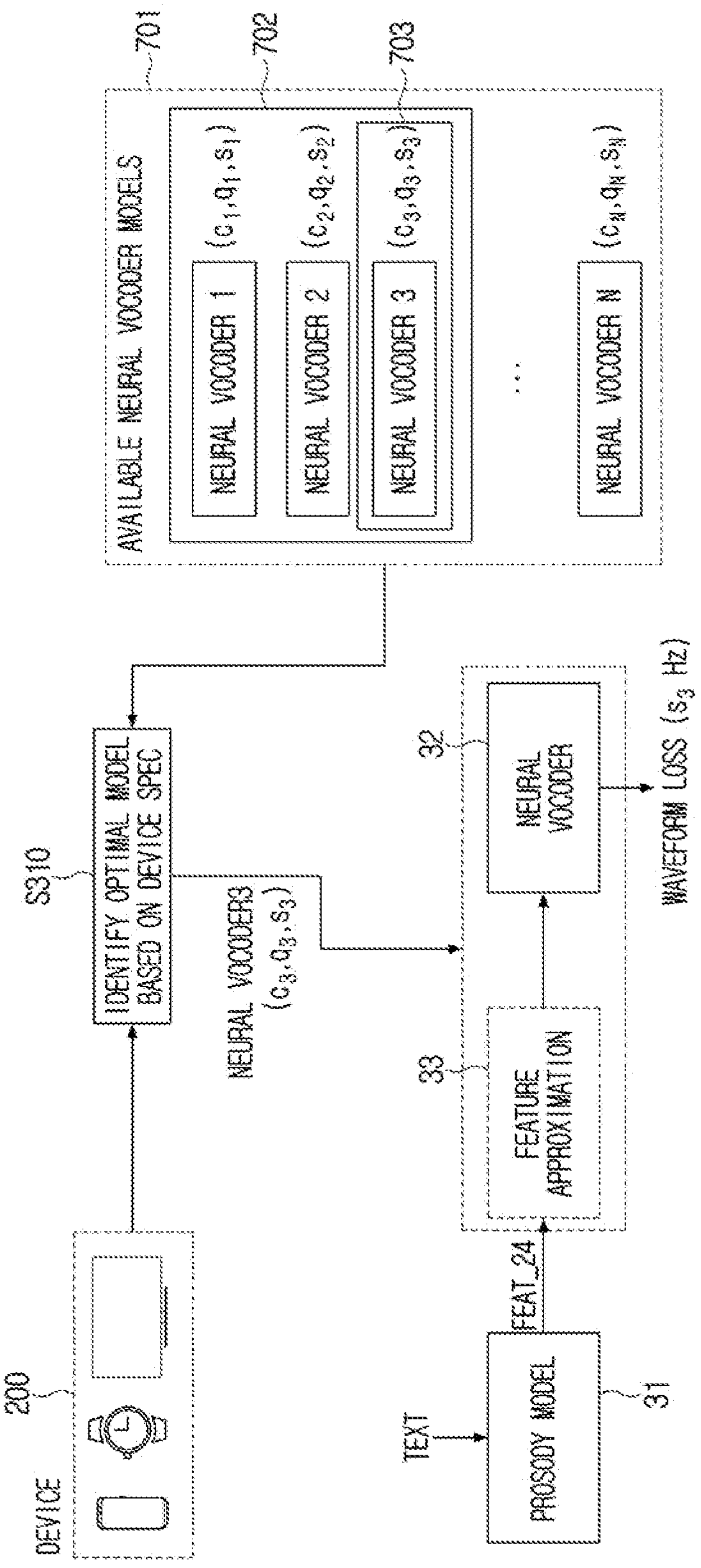
FIGS. 7A and 7B are diagrams illustrating a process of selecting a vocoder learning model corresponding to a terminal apparatus according to an embodiment.
Figure 7B:
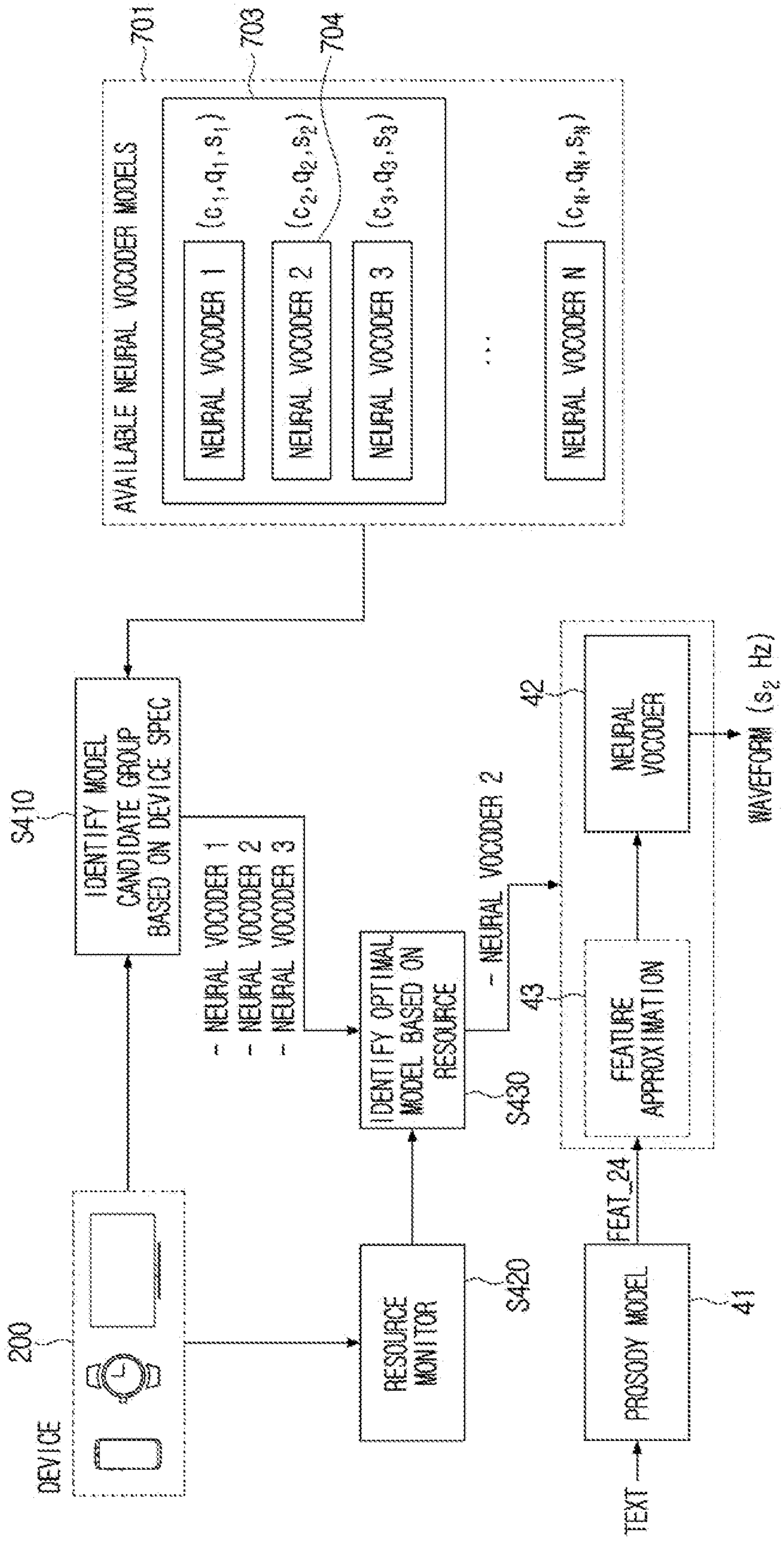

FIGS. 7A and 7B are diagrams illustrating a process of selecting a vocoder learning model corresponding to a terminal apparatus according to an embodiment.

Various vocoder learning models may be generated through the process described in FIGS. 6A and 6B. The generated vocoder learning model may be included in the terminal apparatus 200.

Referring to FIG. 7A, the terminal apparatus 200 may include the plurality of vocoder learning models (e.g. neural vocoder models) 1. For example, a first vocoder learning model (e.g. neural vocoder 1) may include a feature of (c1, q1, s1), a second vocoder learning model (e.g. neural vocoder 2) may include a feature of (c2, q2, s2), a third vocoder learning model (e.g. neural vocoder 3) may include a feature of (c3, q3, s3), and an nth vocoder learning model (e.g. neural vocoder N) may include a feature of (cn, qn, sn). Here, c represents a complexity of the vocoder model, and computational quantity may grow as the complexity becomes greater, q represents the sound quality, and a Signal-to-Noise Ratio (SNR) may increase as the q becomes greater, and s represents the sampling rate.

The terminal apparatus 200 may identify the optimal vocoder learning model based on the specification associated with the terminal apparatus at operation S310. For example, the specification associated with the terminal apparatus may include the resource of the processor, whether there is an operation of the processor, the memory capacity, the memory bandwidth, the performance of the speaker, the specification of the external speaker when the external speaker is connected, and the like. For example, the specification associated with the terminal apparatus may include the internal specification of a fixed terminal apparatus (e.g., processor, memory, etc.) and an external specification of a varying terminal apparatus (e.g., speaker, etc.). The terminal apparatus 200 may identify a candidate group 702 of the vocoder learning model capable of streaming based on the internal specification. Then, the terminal apparatus 200 may select the optimal vocoder learning model 703 based on a different internal specification or external specification. In an embodiment, the candidate group 702 of the vocoder learning model may be (c1, low sound quality, 16 kHz), (c2, medium sound quality, 16 kHz), (c3, high sound quality, 16 kHz), and (c4, low sound quality, 24 kHz). The terminal apparatus 200 may select, based on outputting with the speaker of a smartphone which has a low high frequency expression, a model of (c3, high sound quality, 16 kHz) which has good sound quality even if the sampling rate is low. In embodiments, the terminal apparatus 200 may select, based on outputting with a high quality headphone, a model of (c4, low sound quality, 24 kHz) because providing a high bandwidth can be beneficial even if there is a slight noise. In embodiments, because there can be distortion and additional noise in the case of low-end headphones or earphones, the terminal apparatus 200 may select a model of (c2, medium sound quality, 16 kHz).

The terminal apparatus 200 may extract the acoustic feature from the text by using the prosody model 31, and generate the speech waveform by using the selected vocoder learning model 703 (e.g. neural vocoder 3) included in the vocoder module 32 with the extracted acoustic feature. The terminal apparatus 200 may include the same prosody model and various vocoder learning models. Based on the sampling rate of the acoustic feature extracted from the prosody model and the sampling rate of the selected vocoder learning model 703 being different, the terminal apparatus 200 may approximate the sampling rate of the extracted acoustic feature to the sampling rate of the selected vocoder learning model 703, for example using feature approximation 33. In embodiments, feature approximation 33 may be not included in the terminal apparatus 200, and the feature approximation may not be performed. In an embodiment, based on the sampling rate of the extracted acoustic feature being 24 kHz, and the sampling rate of the selected vocoder learning model being 16 kHz, the terminal apparatus 200 may approximate the sampling rate of the extracted acoustic feature to 16 kHz.

Referring to FIG. 7B, the terminal apparatus 200 may include the plurality of vocoder learning models 701 (e.g. neural vocoder models). The terminal apparatus 200 may identify the candidate group 702 of the vocoder learning model based on the specification of the terminal apparatus at operation S410. The terminal apparatus 200 may identify the candidate group 702 of the available vocoder learning models from all vocoder learning models 701 (e.g. neural vocoder models) included or available in the terminal apparatus. Then, the terminal apparatus 200 may perform monitoring of the resource of the terminal apparatus at operation S420. The terminal apparatus 200 may select the optimal vocoder learning model 704 (e.g. neural vocoder 2) from the identified candidate group based on the resource and the like of the terminal apparatus at operation S430. In an embodiment, when another application (or app) or process is not operated in the terminal apparatus 200, the vocoder learning model of a high sampling rate may be selected. When another app or process is operated and there is little resource, the vocoder learning model of a low sampling rate may be selected. In embodiments, when there is much memory usage, the terminal apparatus 200 may select the vocoder learning model with a low complexity and a low sampling rate.

The terminal apparatus 200 may extract the acoustic feature from the text by using the prosody model 41, and generate the speech waveform by using the selected vocoder learning model (e.g. neural vocoder 2) included in the vocoder module 42 with the extracted acoustic feature. The terminal apparatus 200 may include the same prosody model and various vocoder learning models. Based on the sampling rate of the acoustic feature extracted from the prosody model and the sampling rate of the selected vocoder learning model being different, the terminal apparatus 200 may approximate the sampling rate of the extracted acoustic feature to the sampling rate of the selected vocoder learning model, for example using feature approximation 43. In embodiments, feature approximation 43 may be not included in the terminal apparatus 200, and the feature approximation may not be performed.

Based on the above, the process of training various vocoder learning models and selecting the optimal vocoder learning model have been described. A flowchart of the electronic apparatus and the terminal apparatus will be described below.

Figure 8:
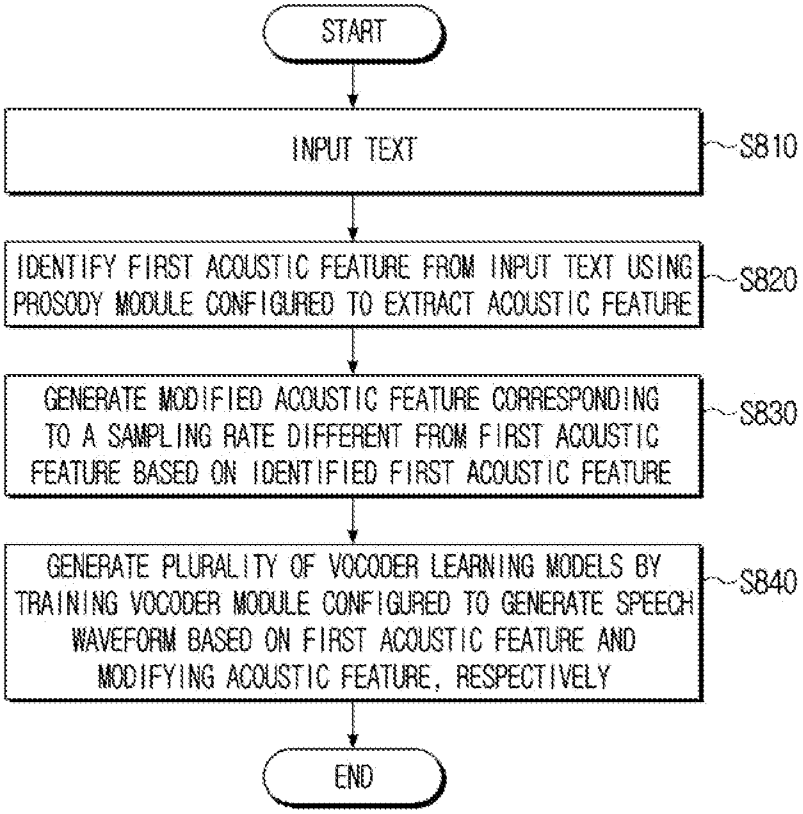
FIG. 8 is a flowchart illustrating a controlling method of an electronic apparatus according to an embodiment.

FIG. 8 is a flowchart illustrating a controlling method of an electronic apparatus according to an embodiment.

Referring to FIG. 8, the electronic apparatus may receive input of the text at operation S810, and identify the first acoustic feature from the input text using the prosody module configured to extract the acoustic feature at operation S820.

The electronic apparatus may generate the modified acoustic feature corresponding to a different sampling rate than the first acoustic feature based on the first acoustic feature at operation S830. For example, the electronic apparatus may generate the modified acoustic feature by down-sampling the first acoustic feature. In embodiments, the electronic apparatus may generate the modified acoustic feature by approximating the first acoustic feature based on the pre-set acoustic feature.

The electronic apparatus may generate the plurality of vocoder learning models by training the vocoder module configured to generate the speech waveform based on the first acoustic feature and the modified acoustic feature, respectively at operation S840. For example, the electronic apparatus may train the vocoder module based on the second modified acoustic feature generated by down-sampling the first modified acoustic feature approximated based on the pre-set acoustic feature and the first acoustic feature.

Figure 9:
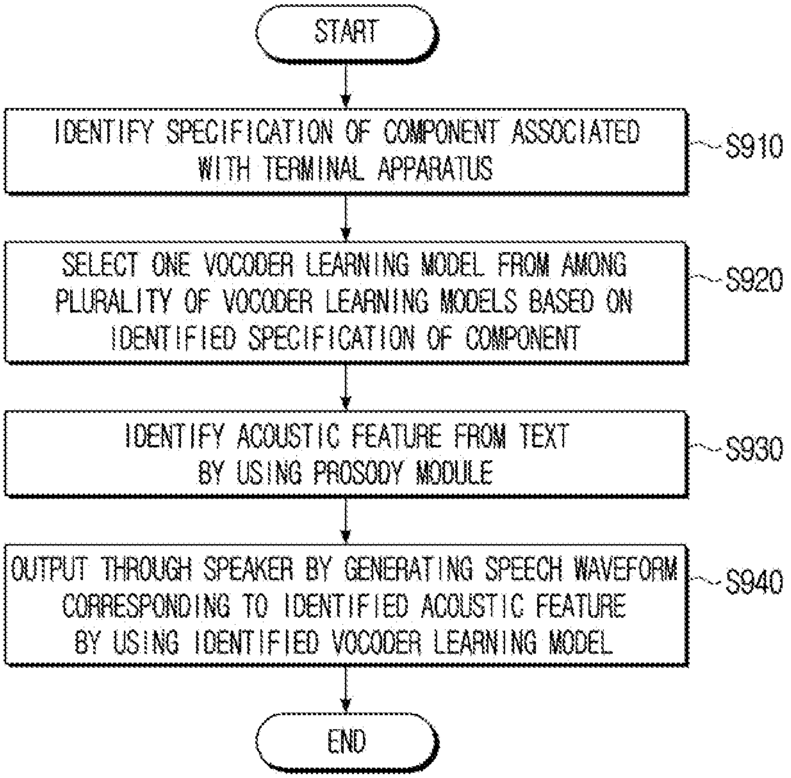
FIG. 9 is a flowchart illustrating a controlling method of a terminal apparatus according to an embodiment.

FIG. 9 is a flowchart illustrating a controlling method of a terminal apparatus according to an embodiment.

Referring to FIG. 9, the terminal apparatus may identify the specification of the component associated with the terminal apparatus at operation S910. For example, the specification of the component may include the resource of the processor, whether there is an operation of the processor, the memory capacity, the memory bandwidth, the performance of the speaker, and the like. The specification of the component associated with the terminal apparatus 200 described above may be the internal specification. The terminal apparatus 200 may be connected to the external speaker. In this case, the specification of the component associated with the terminal apparatus 200 may include information about the external speaker.

The terminal apparatus may select one vocoder learning model from among the plurality of vocoder learning models based on the identified specification of the component at operation S920. For example, the terminal apparatus may identify the candidate vocoder learning model based on the specification of the internal component of the terminal apparatus and whether the streaming output of the speech waveform is possible. The terminal apparatus may select one vocoder learning model based on the high sampling rate and sound quality from among the candidate vocoder learning models. In embodiments, the terminal apparatus may select one vocoder learning model based on the resource of the processor. Based on the external speaker being connected to the terminal apparatus, the terminal apparatus may identify the specification of the external speaker, and select one vocoder learning model based on the identified specification of the external speaker.

The terminal apparatus may identify the acoustic feature from the text by using the prosody module at operation S930, and output to the speaker by generating the speech waveform corresponding to the identified acoustic feature using the identified vocoder learning model at operation S940.

The controlling method of the electronic apparatus and the controlling method of the terminal apparatus according to the various embodiments described above may be provided as a computer program product. The computer program product may include a software (S/W) program itself or a non-transitory computer readable medium stored with the S/W program.

The non-transitory computer readable medium may refer to a medium that stores data semi-permanently rather than a medium that stores data for a very short time, such as a register, a cache, a memory, or the like, and is readable by a device. Specifically, the various applications or programs described above may be stored and provided in the non-transitory computer readable medium such as, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus comprising:

an input interface; and a processor comprising a prosody module configured to extract an acoustic feature and a vocoder module configured to generate a speech waveform, wherein the processor is configured to:

receive a text input using the input interface;

identify a first acoustic feature from the text input using the prosody module, wherein the first acoustic feature corresponds to a first sampling rate;

generate a modified acoustic feature corresponding to a modified sampling rate different from the first sampling rate, by performing approximation of the identified first acoustic feature based on a pre-set acoustic feature; and generate a plurality of vocoder learning models by training the vocoder module based on the first acoustic feature and the modified acoustic feature.

2. The electronic apparatus of claim 1, wherein the processor is further configured to generate the modified acoustic feature by down-sampling the first acoustic feature.

3. The electronic apparatus of claim 1, wherein the modified acoustic feature comprises a first modified acoustic feature, and wherein the processor is further configured to train the vocoder module based on the first modified acoustic feature approximated based on the pre-set acoustic feature and a second modified acoustic feature generated by down-sampling the first acoustic feature.

4. A controlling method of an electronic apparatus, the method comprising:

receiving a text input;

identifying a first acoustic feature from the text input using a prosody module configured to extract an acoustic feature, wherein the first acoustic feature corresponds to a first sampling rate;

generating a modified acoustic feature having a modified sampling rate different from the first sampling rate by performing approximation on the identified first acoustic feature based on a pre-set acoustic feature; and generating a plurality of vocoder learning models by training a vocoder module configured to generate a speech waveform based on the first acoustic feature and the modified acoustic feature.

5. The method of claim 4, wherein the modified acoustic feature is generated by down-sampling the first acoustic feature.

6. The method of claim 4, wherein the modified acoustic feature comprises a first modified acoustic feature, and wherein the generating the plurality of vocoder learning models comprises training the vocoder module based on the first modified acoustic feature and a second modified acoustic feature generated by down-sampling the first acoustic feature.

7. A system for generating speech waveforms, the system comprising:

an electronic device comprising an input/output (I/O) interface and a first processor, wherein the first processor includes a first prosody module configured to extract acoustic features and a first vocoder module configured to generate the speech waveforms, wherein the first processor is configured to:

receive a first text input using the I/O interface;

determine a first acoustic feature from the first text input using the first prosody module, wherein the first acoustic feature corresponds to a first sampling rate;

generate a modified acoustic feature corresponding to a modified sampling rate different from the first sampling rate, by performing approximation of the identified first acoustic feature based on a pre-set acoustic feature; and generate a plurality of vocoder learning models by training the first vocoder module based on the first acoustic feature and the modified acoustic feature; and transmit the plurality of vocoder learning models to a terminal device.

8. The system of claim 7, further comprising the terminal device, wherein the terminal device comprises a speaker and a second processor including a second prosody module and a second vocoder module configured to store the plurality of vocoder learning models received from the electronic device, wherein the second processor is configured to:

identify a specification of a component associated with the terminal device;

select a vocoder learning model from among the plurality of vocoder learning models based on the identified specification of the component;

determine a second acoustic feature from a second input text using a prosody module;

generate a speech waveform corresponding to the second acoustic feature using the selected vocoder learning model; and output the speech waveform corresponding to the second acoustic feature through the speaker.

* * * * *